United States Patent [19]

Yanagawa

[11] Patent Number: 4,580,235
[45] Date of Patent: Apr. 1, 1986

[54] ELECTRONIC CALCULATOR WITH CHECK FUNCTION

[75] Inventor: Mikio Yanagawa, Akishimashi, Japan

[73] Assignee: Casio Computer Co., Ltd., Tokyo, Japan

[21] Appl. No.: 498,251

[22] Filed: May 26, 1983

[30] Foreign Application Priority Data

Jun. 5, 1982 [JP] Japan ................................. 57-96800

[51] Int. Cl.⁴ ............................................. G06F 3/147
[52] U.S. Cl. ...................................... 364/710; 364/709
[58] Field of Search ................................ 364/710, 709

[56] References Cited

U.S. PATENT DOCUMENTS

| | | | |
|---|---|---|---|
| 4,138,734 | 2/1979 | Nakata et al. | 364/710 |
| 4,177,520 | 12/1979 | Meff | 364/710 |
| 4,217,656 | 8/1980 | Hirano et al. | 364/710 |
| 4,301,511 | 11/1981 | Shimizu et al. | 364/709 |
| 4,386,412 | 5/1983 | Ito | 364/710 |

Primary Examiner—David H. Malzahn
Attorney, Agent, or Firm—Frishauf, Holtz, Goodman & Woodward

[57] ABSTRACT

An electronic calculator with a check function has at least two display parts. A calculating formula inputted with keys is continuously indicated on one display part. At the same time, operated result data corresponding to the data indicated on the one display part is indicated on the remaining display part. Some data of the inputted calculating formula may be amended during the display and replay of the formula, and the corrected final result data is indicated on the display.

7 Claims, 9 Drawing Figures

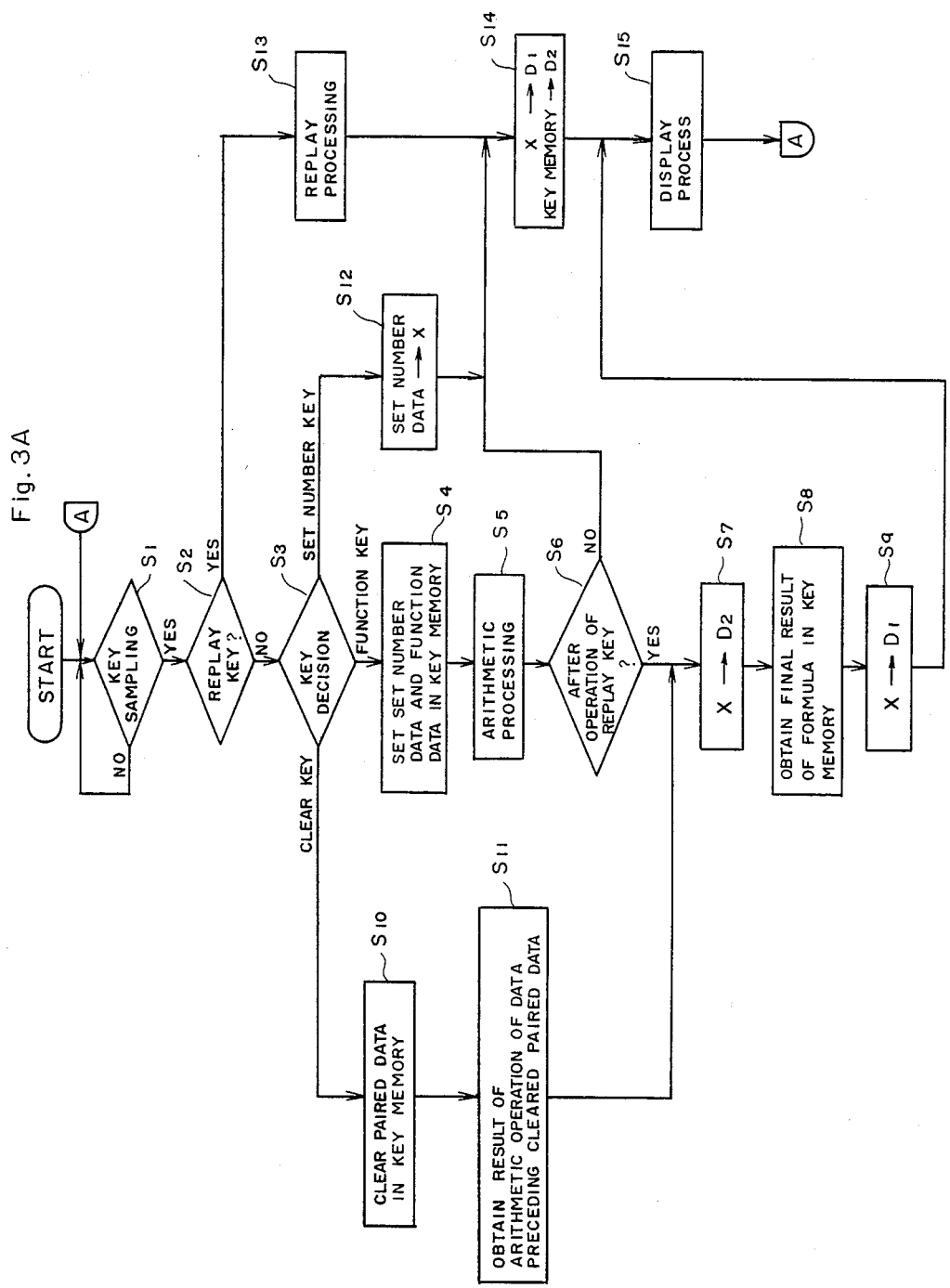

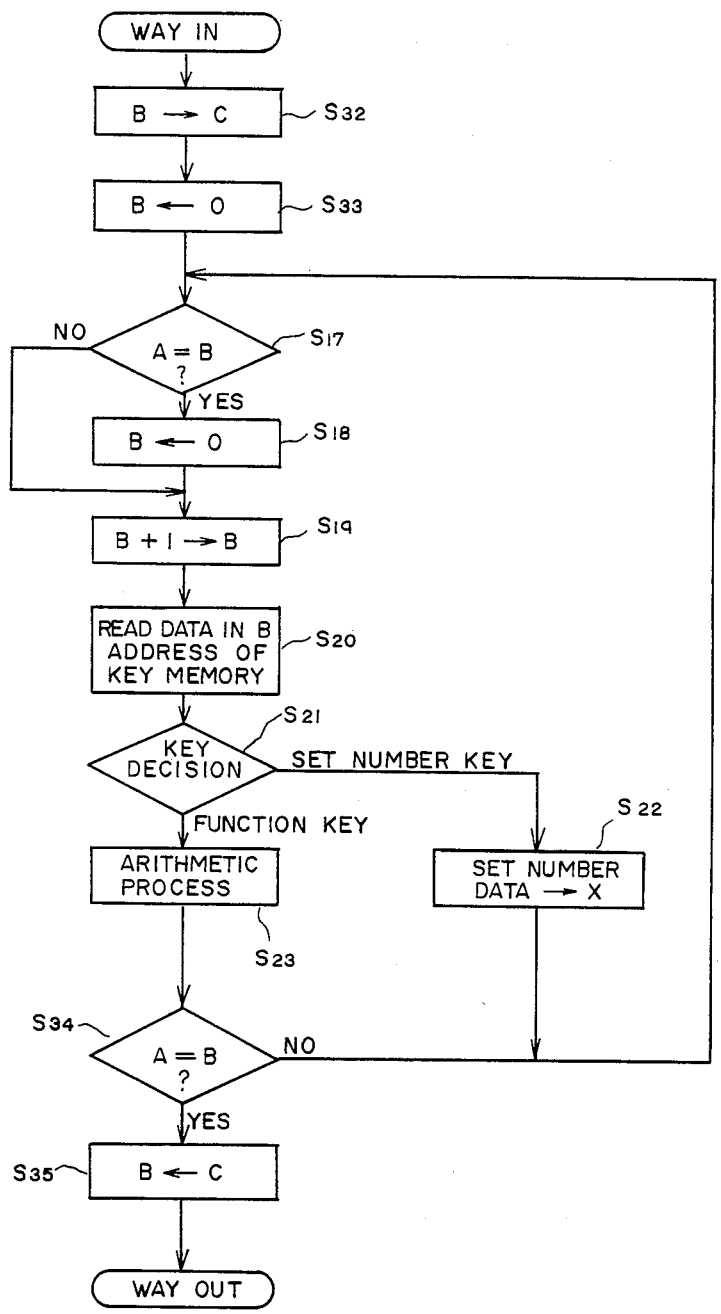

Fig. 4

| (1) | [1] [0] [+] | 10+ / 10. | (7) | [▶] | 10+20+ / 30. |
| (2) | [2] [0] [+] | 10+20+ / 30. | (8) | [2] [5] [+] | 55 / 175. |
| (3) | [3] [0] [+] | 10+20+30+ / 60. | (9) | [▶] | 20+25+30+ / 85. |
| (4) | [4] [0] [+] | 20+30+40+ / 100. | (10) | [▶] | 25+30+40+ / 125. |
| (5) | [5] [0] [=] | 30+40+50= / 150. | (11) | [C] | 85 / 135. |
| (6) | [▶] | 10+ / 10. | (12) | [▶] | 25+30+50= / 135. | ical data and function keys for instructing opera-
ELECTRONIC CALCULATOR WITH CHECK FUNCTION

BACKGROUND OF THE INVENTION

This invention relates to a small-sized electronic calculator with a check function which can store and redisplay a calculating formula inputted with keys.

Heretofore, a small-sized electronic calculator with a check function, in which an inputted calculating formula is kept stored and can be read out by depressing a predetermined key, has been put into practical use. With the calculator of this type, in performing a check after inputting a calculating formula, e.g., "10+20+30=", each time the predetermined key is depressed, one pair of set number data and function data in the stored calculating formula are read out and displayed on a display portion successively as "10+", "20+", ..., and lastly, final operation result data "60" is displayed on the display portion. There has also been put into practical use a small-sized electronic calculator with such a function that, when it becomes necessary during the check to amend (delete or insert) some data in a calculating formula, amendment data can be entered into the place of the amendment.

With such prior-art calculators, however, one pair of set number data and function data are merely indicated on the single display portion at a time. Therefore, the interim result or final result of an operation can not be replayed simultaneously with input data. Another disadvantage is that the relationship between a term being currently displayed and a term succeeding or preceding it in a calculating formula cannot be confirmed.

With the prior-art calculator which permits the amendment, when the amendment data has been inputted in order to amend a part of the calculating formula, only the amended data is indicated on the display portion. Disadvantageously, therefore, how the final result data is changed by the amendment cannot be known.

Furthermore, with the prior-art calculators, the function data is additionally indicated on a partial area of the display portion having a plurality of figure-of-eight digits. This leads to the drawback that the function display is difficult to see.

On the other hand, with small-sized electronic calculators which do not have the check function as stated above, a series of set number data and function data in a calculating formula inputted by key operations are not indicated on a display portion simultaneously with the interim result or final result of the corresponding operation. This leads to the inconvenience that the relationship between the inputted calculating formula and the operated result cannot be known.

SUMMARY OF THE INVENTION

The present invention has been made in view of the circumstances described above, and has for its object to provide an electronic calculator with a check function which comprises at least two display parts, and in which a calculating formula inputted with keys is continuously indicated on one display parts, while at the same time, operated result data corresponding to the data indicated on the display part is indicated on the remaining display part.

Another object of the present invention is to provide a small-sized electronic calculator with a check function in which, when some data of an inputted calculating formula has been amended during the display and replay of the formula, final result data changed by the amendment is indicated on a display part.

According to the present invention, the objects are accomplished by providing a small-sized electronic calculator with a check function comprising key input means including number setting keys for inputting numerical data and function keys for instructing operations such as those conforming to the four fundamental rules of arithmetic, memory means for successively storing set number data and function data outputted by key operations based on a desired calculating formula in said key input means, first display means for continuously indicating a calculating formula in accordance with the key operations on the basis of the set number data and the function data stored in said memory means, arithmetic means for executing an operation on the basis of the set number data and the function data within said memory means corresponding to the calculating formula indicated by said first display means, and second display means for indicating an operated result in said arithmetic means.

BRIEF DESCRIPTION OF THE DRAWINGS

FIGS. 1 to 4 illustrate a first embodiment of the present invention, in which:

FIG. 1 is a plan view of the embodiment of a small-sized electronic calculator with a check function, FIG. 2 is a circuit arrangement diagram of the embodiment, FIGS. 3A to 3D are flow charts of the processing flow of the embodiment, wherein FIG. 3A shows the general processing flow of the embodiment, FIG. 3B shows replay processing, FIG. 3C shows processing for finding a final operation result, and FIG. 3D shows clear processing, and FIG. 4 is a schematic diagram showing key input operations and various statuses of display.

PREFERRED EMBODIMENTS OF THE INVENTION

Figure 1:
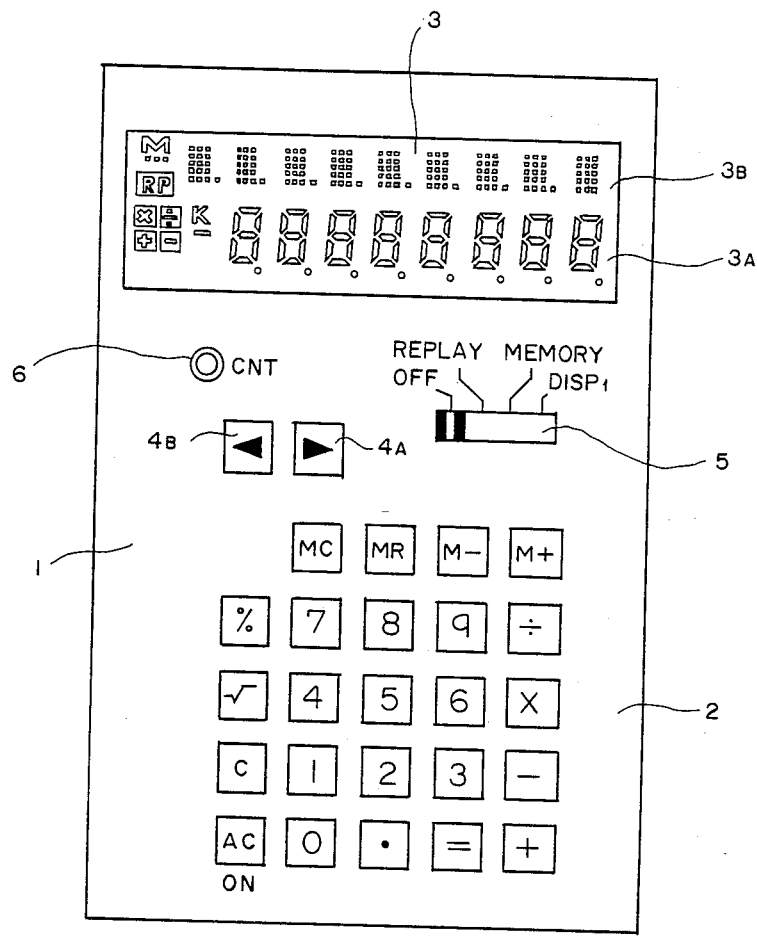

Now, embodiments of this invention will be described with reference to the drawings.

FIGS. 1 to 4 show a first embodiment. A key input portion 2 and a display portion 3 are disposed on the front surface of the case body 1 of a small-sized electronic calculator illustrated in FIG. 1, while electronic circuit components constituting a circuit arrangement in FIG. 2, a battery, etc. are received in the case body 1. The key input portion 2 is provided with ten-keys of [0]–[9], function keys for arithmetical operations and other operations such as [+], [−], [×], [÷] and C, replay keys 4A and 4B, a mode switch 5, and a contrast (CNT) key 6. Each of the replay keys 4A and 4B is a key by which, at a check, the data of a calculating formula inputted with the ten-keys for setting numbers, the function keys, etc. are read out from a key memory (to be described later) storing them in the order of the inputs and are displayed on the display portion 3 again. In this case, the replay key 4A gives a command for successively replaying the data of the calculating formula from the beginning toward the end thereof (in the forward direction), while the replay key 4B gives a command for successively replaying them from the end toward the beginning of the formula (in the reverse direction).

The mode switch 5 sets an off mode at its position "OFF"; a replay mode at its position "REPLAY"; a mode for continually displaying the content of an independent memory on a second display part to be described later, at its position "MEMORY"; and a mode for operating only a first display part to be described later, at its position "DISP$_1$". The contrast key 6 is a key which regulates the display brightness (contrast) of the display portion 3 constructed of a liquid crystal display device through a combination with the replay keys 4A or 4B. When, after the operation of the contrast key 6, the replay key 4A is operated, the display brightness rises with the number of times of the replay key operations. On the other hand, when the replay key 4B is similarly operated, the brightness lowers. Herein, since the display brightness of liquid crystal varies depending upon the magnitude of a drive voltage, there is disposed a counter whose content changes up/down through the operations of the contrast key 6 and the replay key 4A or 4B. In accordance with the count value of this counter, a predetermined voltage value is selected from among a large number of voltage values and is applied to the liquid crystal. Thus, the display brightness changes in 16 stages by way of example. After the contrast key 6 and the replay keys 4A or 4B are operated, the desired contrast is established by the operation of a key other than those keys.

When broadly divided, the display portion 3 consists of the first display part 3A on the lower side thereof and the second display part 3B on the upper side thereof. The first display part 3A is constructed of eight digits each of which is formed of figure-of-eight display segments, while the second display part 3B is constructed of nine digits each of which is formed of a matrix display element of $3 \times 5$ dots. As illustrated in FIG. 1, the display elements ps $\times$, $\div$, $+$, $-$, K, RP and M are also disposed at the left end parts of the first display part 3A and second display part 3B to indicate the functions of multiplication, division, addition, subtraction and a constant, the replay mode, and the memory mode, respectively.

Figure 2:
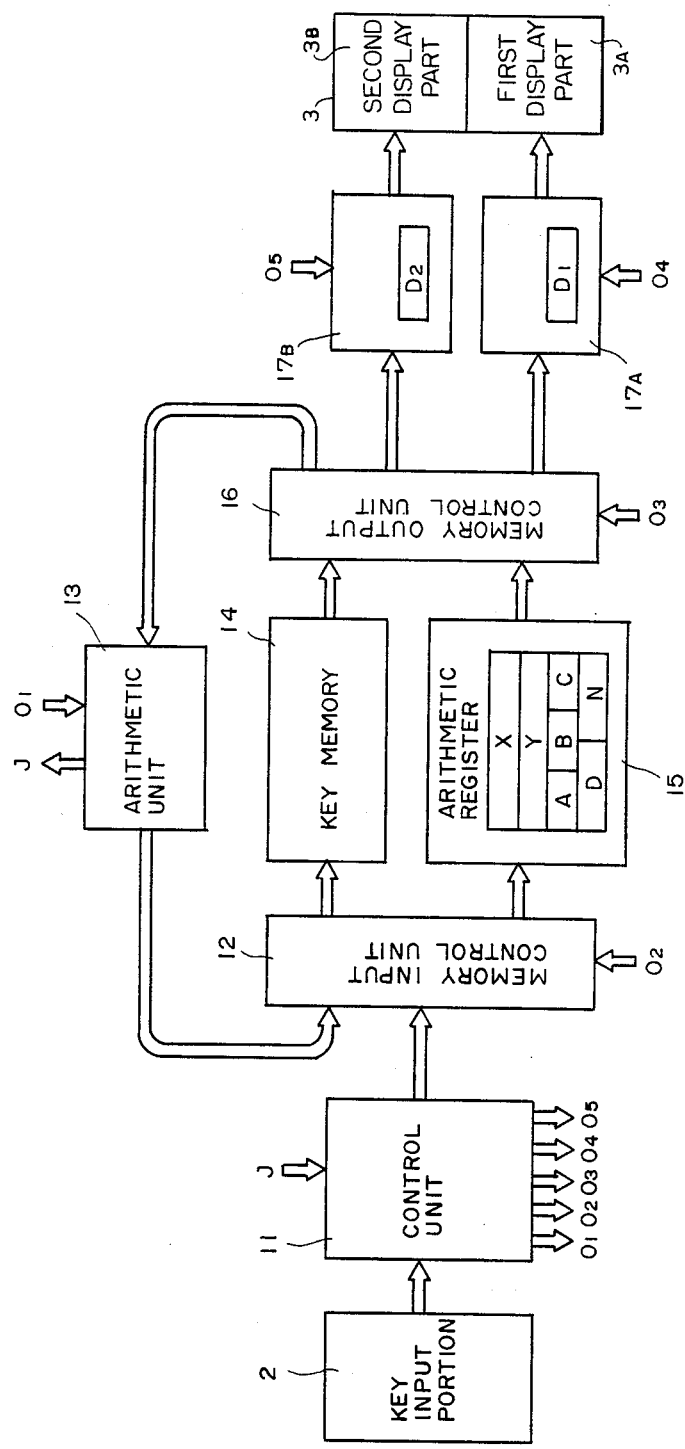

Referring now to FIG. 2, the circuit arrangement will be described. Outputs from the keys and switches of the key input portion 2 enter a control unit 11. This control unit 11 is a circuit which controls the various operations of the small-sized electronic calculator, and which is constructed of a microprocessor by way of example. It delivers control instructions $O_1$-$O_5$ as outputs. A memory input control unit 12 is supplied with data corresponding to the outputs of the key input portion 2 from the control unit 11, and is also supplied with operated result data from an arithmetic operation unit 13. In accordance with the control instruction $O_2$, the memory input control unit 12 applies the input data to the key memory 14 or an arithmetic operation register 15. The key memory 14 stores the calculating formula inputted by key operations, and its storage capacity is 50 in terms of the number of times of the key operations (the number of times of the operations of the ten-keys and function keys). The arithmetic register 15 consists of an X register and Y register for storing operands, an A register for counting the aforementioned number of times of key operations, a B register for indicating that address of the key memory 14 in which the data of the least significant digit of the second display part 3B is stored, registers C, D and N for temporary storage, and other registers and the independent memory, not shown. Data outputted from the key memory 14 and the arithmetic register 15 are inputted to a memory output control unit 16. This memory output control unit 16 delivers the input data to any of the arithmetic unit 13, a first display control part 17A and a second display control part 17B in accordance with the control instruction $O_3$.

The arithmetic unit 13 executes various operations in accordance with the control instruction $O_1$, and delivers the operated result data to the memory input control unit 12. Besides, it delivers the result of a judge operation, e.g., data of address jump J to the control unit 11.

The first display control part 17A and second display control part 17B have display registers $D_1$ and $D_2$ and control the display operations of the first display part 3A and second display part 3B in accordance with the control instructions $O_4$ and $O_5$, respectively.

Next, the operations of the first embodiment will be described with reference to FIGS. 3A-3D and FIG. 4.

FIG. 3A is a flow chart which outlines the operations of the present embodiment. In the flow chart, regarding a step $S_{13}$ for replay processing, steps $S_{10}$ and $S_{11}$ for data clear processing, and a step $S_8$ for the arithmetic processing of finding a final result, key decision processing (steps $S_2$ and $S_3$), arithmetic processing (steps $S_4$ and $S_5$), etc. are repeatedly executed in the performance of the processing within each step. In order to avoid the unnecessary complicacy of the description, however, the respective processing steps are expressed as being independent here.

There will now be explained a case where, with the small-sized electronic calculator having a check function according to the present invention, the following calculating formula (1) is inputted and operated, and after being inputted, the calculating formula is replayed on the display portion 3 in order to perform a check:

$$10+20+30+40+50=150 \tag{1}$$

First, the mode switch 5 is brought to the position "REPLAY" to set the replay mode. Subsequently, in order to input a numerical value "10", the ten-key $\boxed{1}$ is depressed. Thus, the output of the key input portion 2 in FIG. 2 enters the control unit 11, which in turn discriminates the sort of the operation key and delivers the control instructions $O_1$-$O_5$ of the corresponding content. In the current case, the decided set-number data "1" is inputted to the X register of the arithmetic register 15 under the control of the memory input control unit 12. The data "1" inputted to the X register is transmitted to the display register $D_1$ of the first display control part 17A under the control of the memory output control unit 16 and is displayed at the first digit of the first display part 3A.

The above operations proceed in the flow chart of FIG. 3A, as follows. The output of the key input portion 2 is applied to the control unit 11 by the key sampling processing of a step $S_1$. In the next processing of the step $S_2$, the control unit 11 decides whether or not the operated key is the replay key. Since the operated key is not the replay key now, the control flow advances to the step $S_3$. This step $S_3$ decides whether the operated key is the ten-key (any of the keys $\boxed{0}$ - $\boxed{9}$), the function key (any of the keys $\boxed{+}$, $\boxed{-}$, $\boxed{\times}$, $\boxed{\div}$ and $\boxed{=}$), or the clear key (the key C). Since the operated key is the ten-key in the current case, the control flow advances to a step $S_{12}$, in which the set number data "1" is inputted to the X register. Next, the control flow advances to a step $S_{14}$, in which the data "1" in the X register is transmitted to the display register $D_1$ and the data of the key memory to the display register $D_2$. Owing to the display processing of the next step $S_{15}$, the data "1" is displayed at the first digit of the first display part 3A. Since no data has been inputted to the key memory yet, nothing is displayed on the second display part 3B. Subsequently, the control flow returns to the step $S_1$.

When the ten-key $\boxed{0}$ is depressed, quite the same operations as in the foregoing case of the ten-key $\boxed{1}$ are executed. The data "0" is inputted to the X register, and the data "1" having been previously inputted is carried, with the result that the data "10" is displayed on the first display part 3A.

Next, when the key $\boxed{+}$ is depressed, the data "10" in the X register is transmitted to the Y register, and the data "10+" is set in the key memory 14. The data "10+" is inputted to the display register $D_2$ of the second display control part 17B, and is displayed on the second display part 3B. The first arithmetic processing is executed by the arithmetic unit 13, and the operated result data "10" is displayed on the first display part 3A.

The above operations proceed in the flow chart of FIG. 3A, as follows. After the respective processing of the steps $S_1$ and $S_2$, it is decided in the step $S_3$ that the operated key is the function key, and the control flow advances to the step $S_4$. In this step $S_4$, the data "10+" is inputted to addresses 1-3 of the key memory 14 in accordance with the content of the B register ("0" in the current case). At this time, "3" being the number of times of key operations is set in the A register, while "3" being the address where "+" being the data of the least significant digit of the second display part 3B is stored in the key memory 14 is set in the B register. The control flow further advances to the step $S_5$, in which the data in both the registers X and Y are added, and the result data "10" is set in the X register. The control flow subsequently advances to a step $S_6$, which decides whether or not the replay key 4A or 4B has been operated. Since the decision is "NO" in the current case, the control flow proceeds to the step $S_{14}$, in which the result data "10" set in the X register is inputted to the display register $D_1$ of the first display control part 17A, while the data "10+" from the key memory 14 is inputted to the display register $D_2$ of the second display part 17B. Owing to the display processing of the step $S_{15}$, the data "10" is indicated on the first display part 3A of the display portion 3, and the data "10+" on the second display part 3B thereof, as shown at (1) in FIG. 4. Subsequently, the control flow returns to the step $S_1$.

When data "20+" is subsequently inputted, similar operations to the above are executed. After the depression of the $\boxed{+}$, the data "20+" is further inputted to the key memory 14 by the step $S_4$, and the content of the key memory 14 becomes "10+20+". At that time, both the data of the A register and B register become "6". The addition between the data "10" and "20" is executed, the result data "30" is inputted to the X register, and the display status of the display portion 3 becomes as shown at (2) in FIG. 4.

Further, when data "30+" and "40+" are successively inputted, the data of the key memory 14 become "10+20+30+" and "10+20+30+40+". Besides, the respective operation interim-result data "60" and "100" are inputted to the X register, and they are consequently indicated on the display portion 3 as shown at (3) and (4) in FIG. 4. Both the data of the A register and B register become "9" and then "12".

Lastly, when data "50=" is inputted, data "10+20+30+40+50=" is stored in the key memory 14. The contents of both the A register and B register are subjected to +3 to become "15", the final operation result data "150" is inputted to the X register, and the display portion 3 effects display as shown at (5) in FIG. 4.

It is now supposed that the check is performed by depressing the replay key 4A which replays the calculating formula in the forward direction.

When the replay key 4A is depressed once, the depression of the replay key 4A is decided by the processing of the step $S_2$ through the step $S_1$, and the replay processing of the step $S_{13}$ is executed. This replay processing will be concretely explained later with reference to FIG. 3B. When briefly stated here, the step $S_{13}$ performs the processing wherein, while the data in the A register and B register are being referred to, one pair of set number data and function data or the data "10+" in the current case are first read out from the addresses 1-3 of the key memory 14, and the operation is executed to input the result data "10" to the X register. In the current case, the content of the A register is "15", while that of the B register is "3". After the respective processing of the following steps $S_{14}$ and $S_{15}$, the control flow returns to the step $S_1$. Thus, the calculating formula and the interim result are displayed and replayed on the display portion 3 as shown at (6) in FIG. 4.

When the replay key 4A is depressed once more, the replay processing operations are executed likewise to the above, the content of the B register becomes "6" with the content of the A register remaining unchanged. As a result, the interim result "30" is indicated on the first display part 3A, and the calculating formula "10+20+" on the second display part 3B, as shown at (7) in FIG. 4.

Here will be explained the operations of a case where it becomes necessary to amend the initial calculating formula (1), and "25+" is to be inserted following the calculating formula "10+20+" shown at (7) in FIG. 4. That is, the following formula is calculated:

$$10+20+25+30+40+50=175 \qquad (2)$$

First, the keys $\boxed{2}$, $\boxed{5}$ and $\boxed{+}$ are depressed as shown at (8) in FIG. 4. In this case, as already stated, when the keys $\boxed{2}$ and $\boxed{5}$ are depressed, the processing of the steps $S_1$-$S_3$, $S_{12}$, $S_{14}$ and $S_{15}$ are repeated twice, and the data "25" is inputted to the X register and is indicated on the first display part 3A. When the key $\boxed{+}$ is subsequently depressed, the control flow advances to the step $S_4$ via the steps $S_1$-$S_3$, the contents of addresses 7-15 in the key memory 14, namely, "30+40+50=" are shifted to addresses 10-18, and the data "25+" are inserted and set in the addresses 7-9 of the key memory 14. At this time, the content of the A register is subjected to "+3" to become "18", and that of the B register is also subjected to "+3" to become "9". In the next step $S_5$, the interim result data "55" till then is calculated and is inputted to the X register. Further, the control flow advances to the step $S_6$. Now that the replay key 4A has been depressed in the status of (7) in FIG. 4, the decision of the step $S_6$ becomes "YES", and the control flow advances to a step $S_7$. In the step $S_7$, the data "55" within the X register is transmitted to the display register $D_2$, whereupon the control flow advances to the step $S_8$. The concrete flow chart of the step $S_8$ is shown in FIG. 3C. In brief, the step $S_8$ performs the processing in which the calculating formula stored in the key memory 14, namely, "10+20+25+30+40+50=" in the current case is calculated to the last, and the final result "175" is obtained and inputted to the X register. The data "175" within the X register is transmitted to the display register $D_1$ by the processing of a step $S_9$ and is indicated on the display portion 3 by the display processing of the step $S_{15}$. Accordingly, the display portion 3 indicates the final result data "175" on the first display part 3A and the interim result data (subtotal data) "55" on the second display part 3B as shown at (8) in FIG. 4.

In the next place, when the replay key 4A is depressed still once more in order to continue the check, the processing proceed in the sequence of the steps $S_1$, $S_2$ and $S_{13}$. In the step $S_{13}$, the replay processing of the status subsequent to the preceding key operation of the replay key 4A is executed. More specifically, the display status of (7) in FIG. 4 was established by the preceding depression of the replay key 4A, and the data "6" was stored in the B register at that time. By the insertion of the data "25+", however, the B register has been subjected to +3 to become "9". Accordingly, data to be read out by the depression of the replay key 4A this time is data "30+" which succeed the data "10+20+25+", that is, which is stored in the addresses 10–12 of the key memory 14. The data "30+" is subjected to the arithmetic processing, and the respective processing of the steps $S_{14}$ and $S_{15}$ are executed. Thus, as shown at (9) in FIG. 4, the interim result data "85" till then is indicated on the first display part 3A, and the part "20+25+30+" of the calculating formula on the second display part 3B. That is, the inserted term is also displayed. At this time, the data "18" is held set in the A register, and the data of the B register is subjected to +3 to become "12".

Next, when the replay key 4A is depressed once more, similar processing is performed, whereby the indication of the display portion 3 becomes as shown at (10) in FIG. 4, and the data of the B register becomes "15".

This time, there will be explained the operations of a case where the data "40+" in the calculating formula indicated on the second display part 3B shown in (10) of FIG. 4 is deleted so as to calculate:

$$10+20+25+30+50=135 \tag{3}$$

First, when the key $\boxed{C}$ is depressed once, the depression of this key is decided by the step $S_3$ after the respective processing of the steps $S_1$ and $S_2$, and the control flow advances to the steps $S_{10}$ and $S_{11}$. The step $S_{10}$ executes the processing in which the pair of data "40+" stored in the key memory 14 are cleared one by one, and the data within the key memory 14 are shifted at each clearing. Accordingly, the data "15" is set in the A register, and the data "12" in the B register. The control flow subsequently advances to the step $S_{11}$, in which the operated result data "85" of the data "10+20+25+30+" before the cleared data "40+" is obtained and stored in the X register. In the next step $S_7$, the data "85" within the X register is transmitted to the display register $D_2$. Next, the operation of Formula (3) is executed by the step $S_8$, and the operated result data "135" is transmitted to the X register. The data "135" within the X register is transmitted to the display register $D_1$ by the next step $S_9$, whereupon the display processing of the step $S_{15}$ is executed. Consequently, as shown at (11) in FIG. 4, the display portion 3 indicates the final result data "135" of the new calculating formula (Formula (3)) on the first display part 3A and the interim result data "85" on the second display part 3B.

When the replay key 4A is subsequently depressed once more in order to continue the check, the final result data "135" is indicated on the first display part 3A of the display portion 3 and the part "25+30+50=" of the calculating formula (3) on the second display part 3B as shown at (12) in FIG. 4, owing to the respective processing of the steps $S_1$, $S_2$, $S_{13}$, $S_{14}$ and $S_{15}$.

Next, the steps $S_{13}$, $S_8$, $S_{10}$ and $S_{11}$ which are not explained in detail by referring to FIG. 3A will be described with reference to FIG. 3B, 3C and 3D. Some of the processing steps are repeated in order to make the processing to be understood more easily.

Figure 3B:
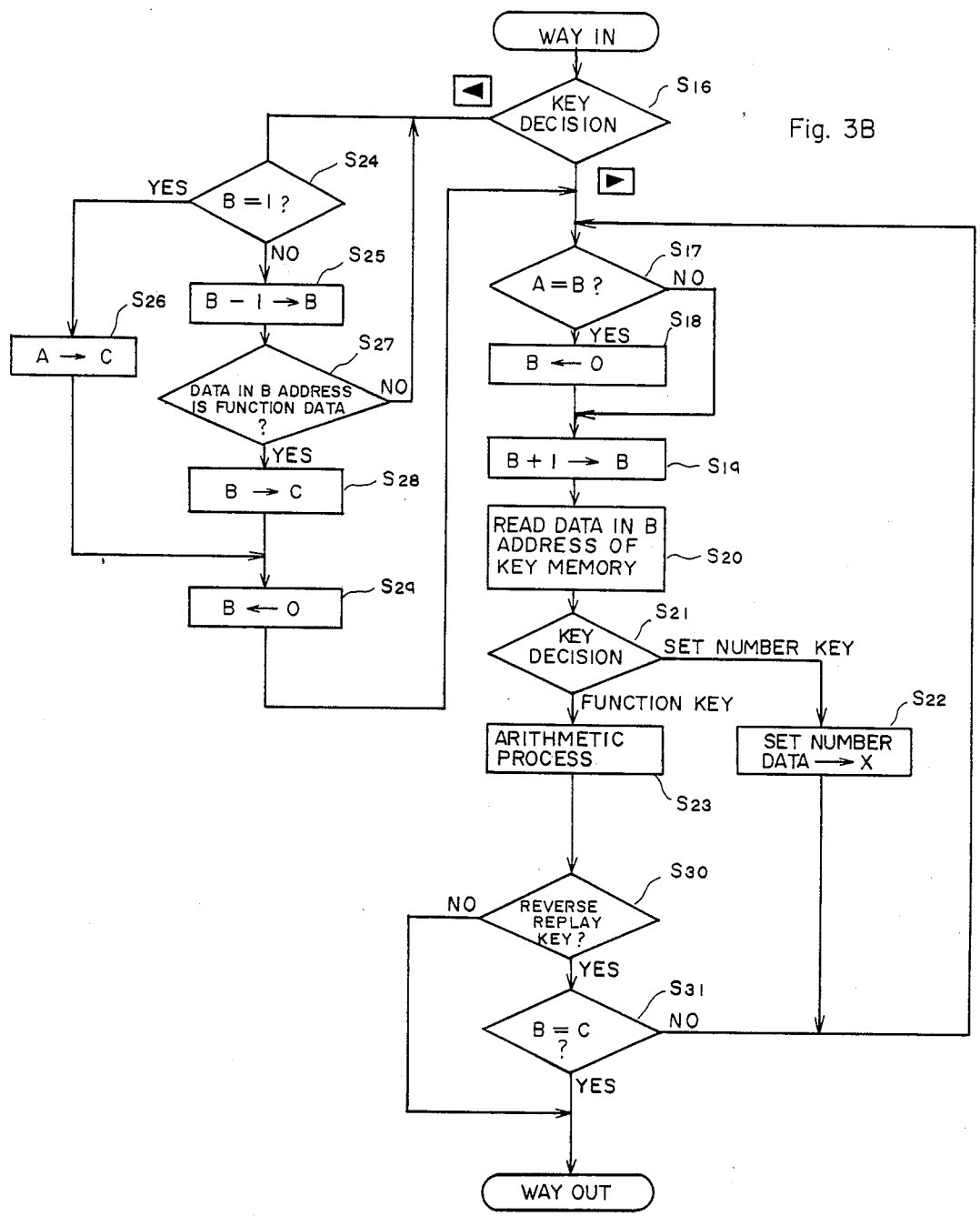

FIG. 3B is a detailed flow chart of the step $S_{13}$ for performing the replay processing. After the operation of the replay key is detected in the step $S_2$, it is decided in a step $S_{16}$ whether it is the replay key 4A for the forward direction or the replay key 4B for the reverse direction.

When the forward direction replay key 4A is depressed, the control flow advances to a step $S_{17}$. When the content of the A register coincides with that of the B registers, the "YES" route is followed as the first replay processing, and the B register is cleared in a step $S_{18}$ and then is subjected to a "+1" operation in a step $S_{19}$. After the processing of the step $S_{19}$ is completed, the control flow advances to a step $S_{20}$ in which the data stored in the B register at that time is considered as an address of the key memory 14 and the data stored in the address of the key memory 14 is read out. In a step $S_{21}$, it is decided whether the read out data is the ten-key data or the function key data, if it is the ten-key data, the control flow advances to a step $S_{22}$ and the read out data is transmitted to the X register, causing the flow to return to the step $S_{17}$. If the read out data is the function key data, an arithmetic processing is executed in a step $S_{23}$, thereby storing the result data into the X register and making the flow to advance to a step $S_{30}$. It is decided, in the step $S_{30}$ whether it is the reverse direction replay. As the forward direction replay is selected, the "NO" route is followed and the control flow goes out of the processing of the step $S_{13}$.

If the reverse direction replay key 4B is selected, the flow goes from the step $S_{16}$ to a step $S_{24}$. It is decided in the step $S_{24}$ whether the content of the B register is equal to "1" and if it is equal to "1", the flow advances to a step $S_{26}$ in which the content of the A register is transmitted to the C register and saved therein, thereby making the flow to proceed to a step $S_{29}$. On the other hand, if it is not equal to "1", the B register is subjected to the "−1" operation at a step $S_{25}$. In the Step $S_{27}$, the data stored in the key memory 14 is read out from the address which is equal to the data of the B register subjected to the "−1" operation and it is decided whether it is the function key data. If it is not the function key data, the "NO" route is followed and the flow returns to the step $S_{24}$. If it is the function data, the content of the B register is transmitted to the C register in the step $S_{28}$ and the flow proceeds to the step $S_{29}$. The content of the B register is cleared in the step $S_{29}$ and the flow advances to the step 17. Then, in the same manner as explained with regard to the forward direction replay key, the processing of the steps $S_{17}$ to $S_{23}$ are executed, thereby proceeding to a step $S_{30}$. As the reverse direction replay key is selected the "YES" route is followed in the step $S_{30}$ and it is decided in a step $S_{31}$ whether the content of the B register concurs with that of the C register. In case of discord, the flow returns to the step $S_{17}$ and the processing of the steps $S_{17}$ to $S_{23}$ and $S_{30}$ is repeated. In case of accord, the flow goes out of the replay processing step $S_{13}$.

FIG. 3C shows a detailed flow chart of the step $S_8$ in which the final result is obtained from the formula stored in the key memory. When the clear key is operated, or when the arithmetic processing of the inserted data is executed after the replay key is depressed, the flow proceeds to a step $S_{32}$ via the step $S_7$. In the step $S_{32}$, the data of the B register is transmitted to the C register and saved therein. Then, the content of the B register is cleared in a step $S_{33}$. The following steps $S_{17}$ to $S_{23}$ are the same as those in case of the replay process. Namely, the address of the key memory 14 is searched one by one and the arithmetic operation is conducted each time when the function data is read out, thereby making the result data to be inputted into the X register. This flow is repeated till the content of the A register concurs with that of the B register. In case of accord, the flow advances to a step $S_{35}$. In the step $S_{35}$ the previous content of the B register which is saved in the C register is again transferred to the B register. Then the flow goes out of the step $S_8$, with the final result data kept in the X register.

Figure 3D:
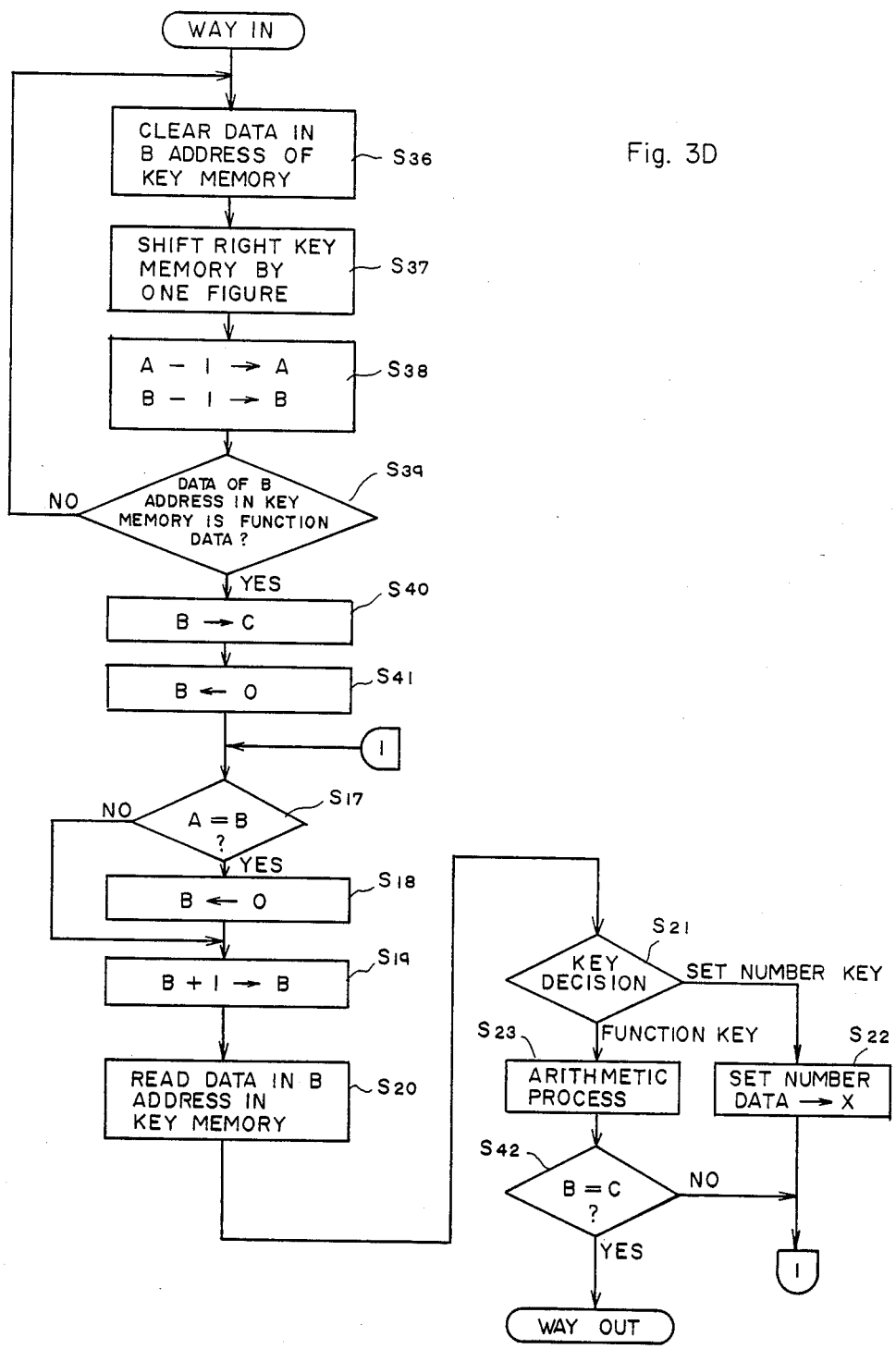

FIG. 3D shows a detailed flow chart of the steps $S_{10}$ and $S_{11}$ in which the clear operation is conducted. When the operation of the clear key is judged in the step $S_3$, the flow proceeds to a step $S_{36}$. The data stored in the B register at that time is read out as an address of the key memory 14 and the data stored in the address of the key memory 14 is cleared in the step $S_{36}$. Then, the flow advances to a step $S_{37}$ and the data stored in the key memory 14 is shifted right by one figure. In a step $S_{38}$, each of the content of the A register and the B register is subjected to a "$-1$" operation and then a step $S_{39}$ is followed. In the step $S_{39}$, the data stored in the B register at that time is read out as the address of the key memory 14 and it is decided whether the data stored in the address of the key memory is the function key data. If it is not the function key data, the flow returns to the step $S_{36}$. Through the repetition of the steps $S_{36}$ to $S_{39}$, the paired data of the ten-key data and function key data is cleared and when the function key data is detected by the step $S_{39}$, the flow proceeds to a step $S_{40}$. In the step $S_{40}$, the data of the B register is transmitted to the C register and saved therein. The B register is cleared in a step $S_{41}$. The following process of the steps $S_{17}$ to $S_{23}$ are the same as in the step $S_{13}$ or $S_8$. Namely, the steps $S_{17}$ to $S_{23}$ are repeated till the content of the B register coincides with that of the C register in a step $S_{42}$. The result of the arithmetic operation of the data preceding the paired data cleared in the previous process is obtained and the result data is inputted into the X register. When the content of the B register concurs with that of the C register, the flow goes out of the clear process steps $S_{10}$ and $S_{11}$.

Figure 5:
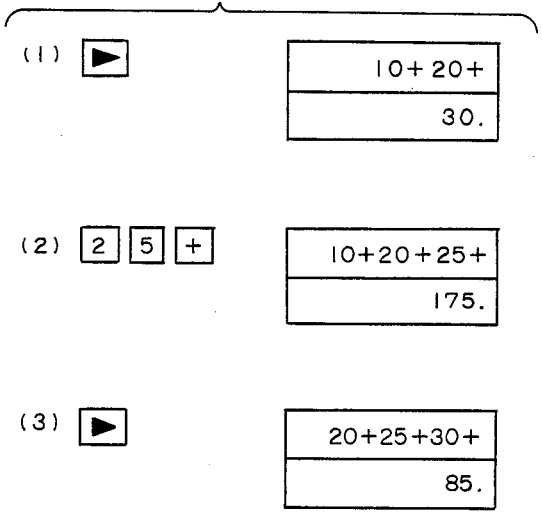
FIGS. 5 and 6 are schematic diagrams showing key operations and various statuses of display in second and third embodiments of the present invention, respectively.

Referring now to FIG. 5, a second embodiment will be described. With the second embodiment, when a formula has been inserted during display and replay, the final result data of the new calculating formula is indicated on the first display part 3A of the display portion 3, and the new calculating formula is indicated on the second display part 3B. Here, (1) of FIG. 5 is the same status as in the foregoing key operations in (7) of FIG. 4. Next, when data "25+" is inserted as shown at (2) in FIG. 5, final result data is indicated on the first display part 3A, and a new calculating formula "10+20+25+" is indicated on the second display part 3B. Subsequently, when the replay key 4A is depressed once, a display status in (3) of FIG. 5 is established, and the display replay is continued. The second embodiment is realized in such a way that the processing of the step $S_7$ of the first embodiment in the flow chart of FIG. 3A, namely, the processing of transmitting the content of the X register to the display register $D_2$ is altered into the processing of transmitting the calculating formula within the key memory to the display register $D_2$ (key memory→$D_2$).

Figure 6:
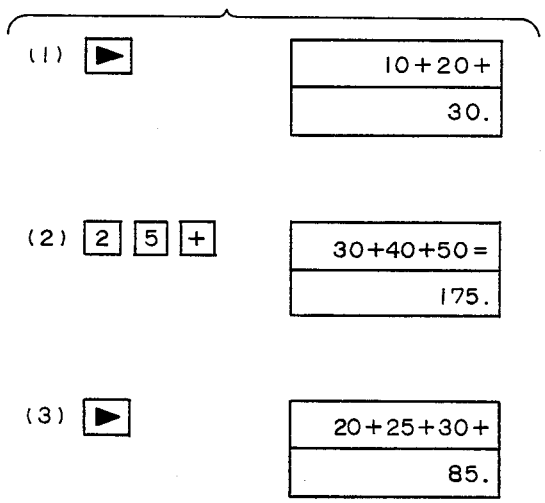

FIG. 6 shows a third embodiment. An example of the calculating formula is the same as in the first or second embodiment. A status illustrated at (1) in FIG. 6 is the same as in (7) of FIG. 4 or (1) of FIG. 5. The feature of the third embodiment is demonstrated by a display status in (2) of FIG. 6. More specifically, when data "25+" is inserted during the re-display of Calculating Formula (1), final result data "175" is indicated on the first display part 3A, while data "30+40+50=" corresponding to the last nine digits of the new calculating formula is indicated on the second display part 3B, so that the relation of the latter with the former is clearly shown. The third embodiment can be realized in such a way that the step $S_7$ of the first embodiment in the flow chart of FIG. 3A is replaced with a step in which the B register is set to an address within the key memory storing the last data "=" of the calculating formula, whereupon the calculating formula is transmitted to the display register $D_2$.

In the foregoing embodiments, the first display part 3A has been constructed of the 8 digits each composed of the figure-of-eight display segments, while the second display part 3B has been constructed of the 9 digits each composed of the matrix display element of 3×5 dots. However, this is not restrictive, but both the display parts may be constructed of either the figure-of-eight display segments or the dot matrix display elements. In addition, the numbers of digits may be set at will.

Further, the addition has been mentioned as one example of the calculating formula. However, similar operations are executed in the other operations conforming to the four fundamental rules of arithmetic, and the addition is not restrictive.

As set forth above, this invention has provided a small-sized electronic calculator with a check function which comprises at least two display parts and in which a calculating formula inputted with keys is continuously indicated on one display part, while at the same time, operated result data corresponding to the display data on the one display part is indicated on the remaining display part. Therefore, it has the advantage that the relationship between the inputted calculating formula and the operated result data can be always confirmed so as to prevent any erroneous key operation.

Moreover, this invention has provided a small-sized electronic calculator with a check function which comprises means to store a calculating formula inputted with keys, and at least two display parts, and in which set number data and function data in the calculating formula are continuously and successively indicated on one display part, operated result data corresponding to the display data on the one display part is indicated on another display part, and the calculating formula is read out and is continuously indicated on the one display part by a predetermined key operation. Therefore, it has the advantage that the corresponding relationship between the calculating formula and the operated result can be always confirmed during the key input operation or the check, so as to prevent any erroneous key operation. Another advantage is that, since the calculating formula can have a plurality of pairs of set number data and function data displayed at a time, the relationship of the preceding and succeeding terms of the formula can be confirmed more clearly. Still another advantage is that the check can be performed more easily when the calculator is designed so as to replay the calculating formula at the check in both the forward and reverse directions.

Besides, the invention has provided a small-sized electronic calculator with a check function in which, when a calculating formula under replay has been partly amended, the final result data of a calculating formula changed by the amendment is indicated on a display part. Therefore, it has the advantage that the changed final result data can be conveniently known as soon as data has been amended. Another advantage is that, when the calculating formula changed by the amendment is indicated along with the display of the final result data, the amended content becomes clearer.

What is claimed is:

1. An electronic calculator with a check function comprising:
    key input means including numerical keys for inputting numerical data, and function keys for inputting function data for instructing arithmetic operations;
    memory means for successively storing a calculating formula including numerical data and function data inputted by key operations in said key input means;
    arithmetic operating means for executing an operation of said stored calculating formula; and
    at least first and second display means, said first display means including means for displaying said calculating formula stored in said memory means, and said second display means including means for displaying an operated result in said arithmetic operating means; and
    said key input means further including replay key means which are operable for successively reading out said numerical data and function data stored in said memory means.

2. The electronic calculator of claim 1, wherein said first display means comprises at least one display stage.

3. The electronic calculator of claim 1, wherein said replay key means includes:
    a first replay key which is operable for successively reading out said numerical data and function data stored in said memory means, in an order in which that have been stored; and
    a second replay key which is operable for successively reading out said numerical data and function data stored in said memory means, in an order reverse to the first-mentioned order.

4. The electronic calculator of claim 1, including means for displaying said calculating formula including numerical data and function data successively read out each time said replay key means is operated on said first display means; and means for displaying an operated result corresponding to said calculating formula displayed on said first display means, on said second display means.

5. The electronic calculator of claim 4, wherein said key input means comprises at least one amendment key which is operable for amending contents of said memory means in correspondence with a corrected content when a desired place of the calculating formula displayed on said first display means has been corrected by operation of said at least one amendment key; and wherein said arithmetic operating means includes means for calculating an amended final result data of the calculating formula stored in said memory means, after said amendment is made by said at least one amendment key.

6. The electronic calculator of claim 5, including means for displaying said final result data calculated by said arithmetic operating means on said second display means; and means for displaying interim result data of an operation in the calculating formula displayed and replayed till then, on said first display means.

7. The electronic calculator of claim 5, including means for displaying said final result data calculated by said arithmetic operating means is displayed on said second display means; and means for displaying the calculating formula including amendment data, on said first display means.

* * * * *